(12) United States Patent
Johnson

(10) Patent No.: US 7,727,044 B1
(45) Date of Patent: Jun. 1, 2010

(54) ANIMAL CALL WITH IMPROVED AIR CHANNEL

(76) Inventor: Leslie W. Johnson, 2171 Road 302, Edgar, NE (US) 68935

( * ) Notice: Subject to any disclaimer, the term of this patent is extended or adjusted under 35 U.S.C. 154(b) by 30 days.

(21) Appl. No.: 12/137,651

(22) Filed: Jun. 12, 2008

Related U.S. Application Data

(60) Provisional application No. 60/934,591, filed on Jun. 14, 2007.

(51) Int. Cl.
    *A63H 5/00* (2006.01)

(52) U.S. Cl. .................. 446/208; 446/207; 446/177; 446/178; 446/180; 446/202; 446/204; 446/213; 84/729; 84/732; 84/350; 84/363; 84/364; 84/383 A; 84/399

(58) Field of Classification Search ............. 446/207, 446/208, 204, 202, 180, 178, 177, 213; 84/729, 84/732, 350, 363, 364, 383 A, 399
See application file for complete search history.

(56) References Cited

U.S. PATENT DOCUMENTS

| | | | | |
|---|---|---|---|---|
| 2,321,193 A | * | 6/1943 | Garrison | 446/208 |
| 2,606,399 A | * | 8/1952 | Graham | 446/213 |
| 2,730,836 A | * | 1/1956 | Faulk et al. | 446/207 |
| 2,969,611 A | * | 1/1961 | Warren Jr. | 446/202 |
| 3,020,675 A | * | 2/1962 | Boecker | 446/208 |
| 3,066,443 A | * | 12/1962 | Mobley | 446/204 |
| 3,212,215 A | * | 10/1965 | Freimauer | 446/213 |
| 4,050,186 A | * | 9/1977 | Shults et al. | 446/207 |
| 4,138,800 A | * | 2/1979 | Lege | 446/207 |
| 4,151,678 A | * | 5/1979 | Robertson | 446/209 |
| 4,179,845 A | * | 12/1979 | Jacob | 446/188 |
| 4,737,130 A | * | 4/1988 | Mann | 446/207 |
| 4,752,270 A | * | 6/1988 | Morton | 446/208 |
| 4,764,145 A | * | 8/1988 | Kirby | 446/208 |
| 4,888,903 A | * | 12/1989 | Knight et al. | 43/1 |
| 4,915,660 A | * | 4/1990 | Overholt, Sr. | 446/207 |
| 4,940,451 A | * | 7/1990 | Leady | 446/208 |
| 4,950,201 A | * | 8/1990 | Sceery | 446/207 |
| 5,222,903 A | * | 6/1993 | Parrott et al. | 446/207 |
| 5,329,872 A | * | 7/1994 | Wright | 116/137 R |
| 5,577,946 A | * | 11/1996 | Oathout | 446/208 |
| 5,582,530 A | * | 12/1996 | Ady | 446/209 |
| 5,885,125 A | * | 3/1999 | Primos | 446/207 |
| 5,910,039 A | * | 6/1999 | Primos et al. | 446/207 |
| 5,975,978 A | * | 11/1999 | Hall | 446/208 |
| 6,039,627 A | * | 3/2000 | Forbes et al. | 446/208 |
| 6,053,794 A | * | 4/2000 | Weiser | 446/207 |
| 6,083,075 A | * | 7/2000 | Meeks | 446/207 |
| 6,120,341 A | * | 9/2000 | Hafford | 446/208 |
| 6,152,798 A | * | 11/2000 | Raburn | 446/207 |
| 6,234,859 B1 | * | 5/2001 | Primos et al. | 446/207 |
| 6,254,451 B1 | * | 7/2001 | Bean | 446/207 |

(Continued)

*Primary Examiner*—Gene Kim
*Assistant Examiner*—Alexander R Niconovich
(74) *Attorney, Agent, or Firm*—Christopher R. Christenson; Westman, Champlin & Kelly, P.A.

(57) ABSTRACT

An animal call includes a mouthpiece, a barrel, and a reed. The mouthpiece defines an air channel therein and has a reed bed proximate the air channel. The barrel is coupled to the mouthpiece and has an internal chamber that is fluidically coupled to the air channel of the mouthpiece. A surface comprising the air channel varies in order to maintain a substantially constant cross-sectional area magnitude along a length of the channel. The reed is disposed adjacent the air channel and proximate the reed bed.

10 Claims, 2 Drawing Sheets

U.S. PATENT DOCUMENTS

| | | | |
|---|---|---|---|
| 6,319,084 B1 * | 11/2001 | Young | 446/27 |
| 6,328,623 B1 * | 12/2001 | Bean | 446/208 |
| 6,413,140 B1 * | 7/2002 | Primos | 446/207 |
| 6,435,933 B1 * | 8/2002 | Browne | 446/207 |
| 6,527,614 B1 * | 3/2003 | Primos | 446/207 |
| 6,572,430 B1 * | 6/2003 | Primos | 446/207 |
| 6,575,804 B1 * | 6/2003 | Primos | 446/202 |
| 6,682,388 B1 * | 1/2004 | Foster | 446/207 |
| 6,767,270 B1 * | 7/2004 | Primos | 446/207 |
| D497,564 S * | 10/2004 | Primos et al. | D11/119 |
| D498,165 S * | 11/2004 | Primos et al. | D10/119 |
| 6,878,867 B2 * | 4/2005 | Porath | 84/402 |
| 7,011,564 B2 * | 3/2006 | Ady et al. | 446/207 |
| 7,037,167 B2 * | 5/2006 | Primos et al. | 446/204 |
| 7,070,473 B1 * | 7/2006 | Cassette | 446/207 |
| 7,083,492 B1 * | 8/2006 | Morocco et al. | 446/208 |
| 7,357,693 B1 * | 4/2008 | Roberts | 446/216 |
| 7,384,323 B2 * | 6/2008 | Sceery | 446/208 |
| 2005/0079789 A1 * | 4/2005 | Bishop | 446/207 |
| 2005/0142982 A1 * | 6/2005 | Sceery | 446/207 |
| 2007/0037471 A1 * | 2/2007 | Pepin | 446/207 |
| 2007/0243790 A1 * | 10/2007 | May | 446/207 |
| 2009/0191786 A1 * | 7/2009 | Pribbanow | 446/207 |

* cited by examiner

SECTION A-A

ANIMAL CALL WITH IMPROVED AIR CHANNEL

CROSS-REFERENCE TO RELATED APPLICATION

The present application is based on and claims the benefit of U.S. provisional patent application Ser. No. 60/934,591, filed Jun. 14, 2007, the content of which is hereby incorporated by reference in its entirety.

BACKGROUND

Wild animals deal with nature's harsh reality every day. Not only must such wild animals find sufficient food to sustain themselves, they must generally avoid predators. In order to adapt to these harsh realities, many wild animals have senses that are far more sensitive than human senses.

Many predators, in general, must chase, or otherwise stalk their prey. One common adaptation for such predators is the ability to perceive depth. Thus, many predators, such as coyotes and wolves have both eyes located on the front of their head in order to facilitate depth perception. Many predators are also keenly aware of depth by virtue of superior hearing. For example, unlike humans, many predators, such as dogs, wolves and coyotes have their ears facing somewhat forward thereby allowing the predators to resolve, at least to some degree, depth from sounds perceived ahead of them. Still another sense that is extremely powerful in some predators is the sense of smell. For example, dogs in general are believed to have a sense of smell that is in the range of one hundred thousand to a million times more sensitive than a human's. All of these senses and abilities combine to provide an innate ability of a predator to perceive and capture prey.

The senses and abilities described above also make the predator, such as a wolf or coyote, an extremely perceptive and cunning prey. In the hunting of such predatory wild animals, it is known to utilize a predator call that potentially mimics the sound of a bleating fawn, or some other natural prey of the sought predator. Additionally, effective predator calling is performed in such a way that the predator believes that it is closing in on some prey, and is not made skittish by some sense, characteristic or artifact either from the hunter, or the call, that is unexpected to the predator.

It is believed that there are three basic things that characterize a good call. First, the call must generate a good tone. Second, the call must facilitate the ability of the hunter generate good cadence, or basically the song or call of the prey. Finally, a good call must also facilitate the generation of proper call volume. In order for a caller to successfully lure a predator, all three factors must be maintained consistently together while the predator is lured.

Of the three factors listed above, volume is believed to be at least among the most important. Specifically, if the call is too loud the predator's inquisitiveness will not be maintained and the predator will not want to investigate the sound. Additionally, many predators have hearing that is so perceptive that based on the distance on the order of 100 to 200 yards, they can gauge their surroundings and the distance and relative position of the caller. If the volume is not consistent with what the predator expects, as far as stalking the pseudo prey, the predator will spook, and not be lured sufficiently close to be taken.

Most wild animal calls utilize a reed that generates a tone by vibrating against a reed bed in response to the hunter's breath. In order to adjust the tone of a call, the length of the reed must be adjusted, which is done by essentially moving the hunter's lips forward or aft on the reed bed. The position of the lips on the reed bed creates a pinch point which defines the portion of the reed that is allowed to resonate and produce the tone. In order for a predator to be successfully lured, predator calls are often relatively complex sounds intended to resemble that of other similar predators, a bleating fawn, or a bleating or distressed jackrabbit. Thus, within the duration of an individual bleat, the cadence and tone of the call may be varied to produce the desired call.

SUMMARY

An animal call includes a mouthpiece, a barrel, and a reed. The mouthpiece defines an air channel therein and has a reed bed proximate the air channel. The barrel is coupled to the mouthpiece and has an internal chamber that is fluidically coupled to the air channel of the mouthpiece. A surface comprising the air channel varies in order to maintain a substantially constant cross-sectional area magnitude along a length of the channel. The reed is disposed adjacent the air channel and proximate the reed bed.

DETAILED DESCRIPTION OF ILLUSTRATIVE EMBODIMENTS

Aspects and embodiments of the present invention are based, at least in part, upon unique perception of deficiencies in wild-animal, and specifically predator calls. Embodiments of the present invention generally improve upon the structure disclosed in U.S. Pat. No. 4,050,186 as well as similar structures. The '186 patent reports a groove or channel that is cut lengthwise and has a substantially constant width, but a depth that varies along the length. More specifically, FIG. 8 of the '186 patent shows a bottom surface of the groove being substantially parallel to a bottom surface of the call itself, while the working surface curves upwardly with length.

One difficulty with predator calling is achieving successful volume control while providing a consistent call. The problem is that the hunter must allow the predator call to go further into the mouth in order to generate a lower pitch, or farther out of the mouth to generate a higher pitch. Typically, this repositioning of the mouth on the reed bed now exposes a larger cross-sectional area (in the case of a lower pitch) of an air channel underneath the reed. This means that in order to create a certain low tone the hunter will have to pass more air through the call and in turn produce the adverse effect that it is actually more difficult for the hunter to maintain a consistent volume going from a high pitch to a low pitch. These inconsistencies in volume, as the predator is being lured, can easily spook the predator.

Figure 1A:
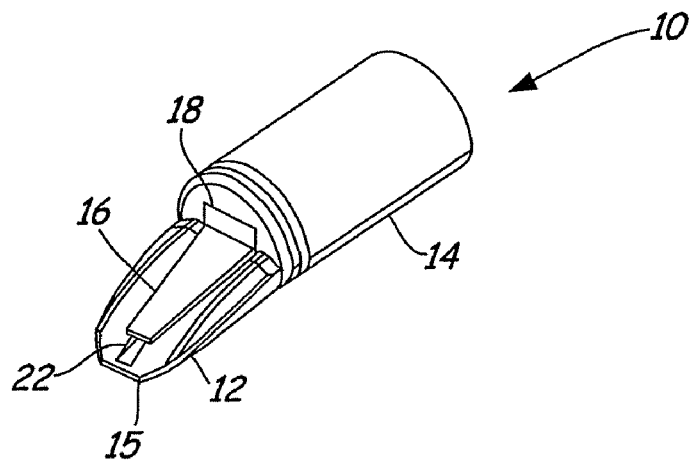
FIG. 1A is a perspective view of a wild animal call in accordance with an aspect of the present invention.

FIG. 1A is a perspective view of a wild animal call in accordance with an embodiment of the present invention. The call illustrated in FIG. 1A is classified as an open reed call. In this type of call, the lips or teeth of the user are used to generate the pinch point that creates or determines the tone of the call. It is also possible to generate a varying pinch point with a mechanical device such as a rubber band or some type of clamping device. Call 10 is shown as one example of an embodiment of the present invention, and those skilled in the art will recognize that other embodiments of the present invention may be able to be practiced using other types of reed-based calls.

Call 10 includes mouthpiece 12 coupled to barrel 14. Mouthpiece 12 defines channel 22 therein, which channel 22 runs from a location proximate end 15 to the interior of barrel 14. End 15 of mouthpiece 12 is illustrated with a preferred curved end shape. Mouthpiece 12 and barrel 14 can be formed as separate pieces and coupled together during manufacturing, or they can be formed as a single unitary piece. Further, it is preferred that mouthpiece 12 and barrel 14 be formed of a material that is conducive to low-cost manufacture, such as injection-moldable plastic. However, any suitable material can be used to construct mouthpiece 12 and barrel 14.

Reed 16 is coupled to mouthpiece 12 and barrel 14 via retainer block 18. Reed 16 is preferably a relatively thin layer of plastic, or other rigidly flexible material. Reed 16 is disposed above, or otherwise proximate, air channel 22. A portion of reed 16 rests against a surface of mouthpiece 12 that is hereinafter referred to as reed bed 28. Reed bed 28 is also sometimes referred to as a "tone board."

Figure 1B:
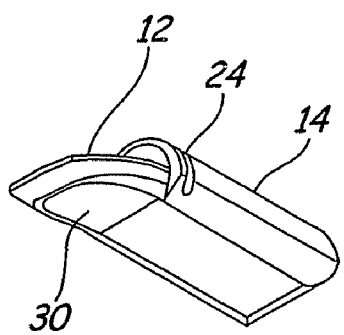
FIGS. 1B and 1C are diagrammatic views of a mouthpiece having a curved end as well as a downward curvature.
Figure 1C:
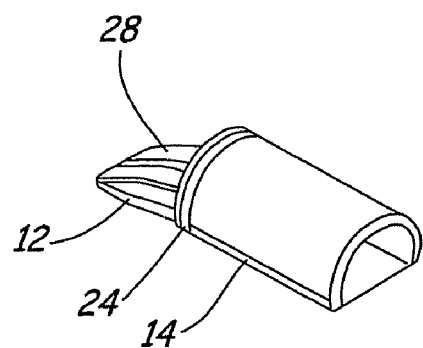

As illustrated in FIGS. 1B and 1C, mouthpiece 12 preferably has a downward curvature both with respect to the reed bed 28, and bottom surface 30. This downward curvature of reed bed 28 is preferably enhanced (smaller radius) than previous calls, and it is believed that such enhanced curvature facilitates the initiation of a call with lower airflow. Additionally, the curvature of bottom surface 30 to approximate the curvature of reed bed 28 is believed to enhance user comfort.

Barrel 14 preferably has a cross section that is approximately D-shaped (best viewed in FIG. 1C). It is believed that features such as the downward-curved mouthpiece and D-shaped barrel will also increase user comfort. The D-shaped barrel is believed to fit more uniformly in the hand. Preferably, barrel 14 also includes a lanyard groove 24.

Figure 1D:
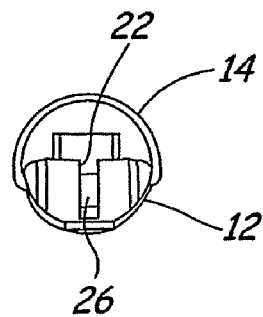
FIG. 1D is a front elevation view of a mouthpiece, barrel, and air channel in accordance with an embodiment of the present invention.

FIG. 1D is a front elevation view illustrating mouthpiece 12, barrel 14, and air channel 22. As illustrated in FIG. 1D, air channel 22 includes a bottom surface 26 that includes at least a portion that follows the shape of reed bed 28. Thus, in embodiments where the shape of reed bed 28 is non-linear, such as a curved surface, bottom surface 26 will preferably have the same non-linear, curved surface.

Figure 1E:
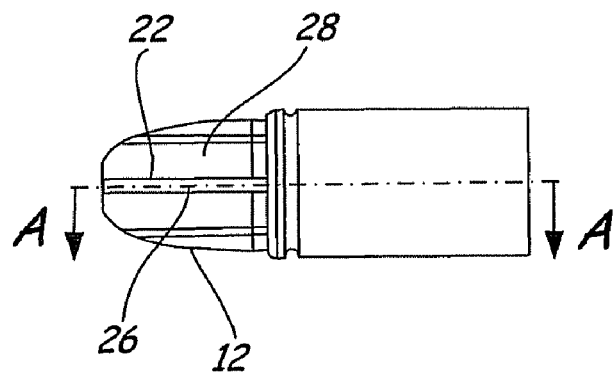
FIGS. 1E, 1F and 1G, are diagrammatic views of a mouthpiece including a reed bed that has a substantially curved shape.
Figure 1F:
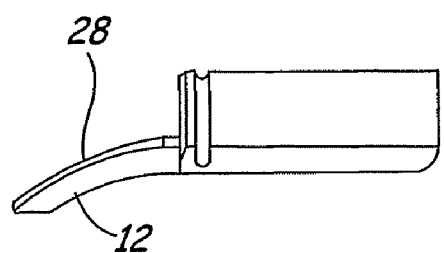
Figure 1G:
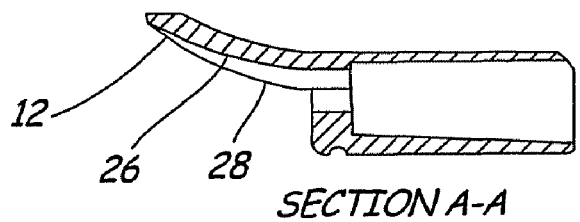

As illustrated in FIGS. 1E, 1F and 1G, mouthpiece 12 includes a reed bed 28 that preferably has a substantially curved shape. Similarly, bottom surface 26 of air channel 22 has a shape that preferably substantially follows that of reed bed 28. The shape of surface 26 ensures that even as the hunter's mouth changes position on the mouthpiece (in order to change tone) the cross-sectional area of air channel 22 in the location beneath the reed at the new pinch point is substantially the same as it was before. This ensures that the amount of air required to generate the new tone is substantially similar to that previously required. Accordingly, precise volume control for the hunter is facilitated.

It is also believed that embodiments and aspects of the present invention generally allow the call to begin generating tone with potentially lower amount of airflow. Accordingly, if a hunter does not wish to generate a loud blast initially in order to get a call started, embodiments and aspects of the present invention may facilitate such subtle calling.

Additionally, since the relative thickness of the mouthpiece is somewhat constant, it is believed that calls in accordance with embodiments and aspects of the present invention will be more comfortable for the hunter for longer periods of time.

Embodiments of the present invention, described thus far, generally maintain a relatively constant air flow through the air channel because the bottom surface of the channel follows the reed bed. However, it is expressly contemplated that any of the three surfaces that define the channel (two side surfaces and bottom surface 26) can be varied, in complementary fashions, such that constant cross-sectional area is maintained within the channel along the length of the channel. In this regard, embodiments of the present invention include game or animal calls that have a bottom surface shape that diverges from the shape of the reed bed, but that is otherwise compensated by variations in channel width.

Although the present invention has been described with reference to preferred embodiments, workers skilled in the art will recognize that changes may be made in form and detail without departing from the spirit and scope of the invention.

What is claimed is:

1. An animal call comprising:
   a mouthpiece defining an air channel therein and having a reed bed proximate the air channel, the air channel having a bottom surface that is curved along a length of the air channel, wherein the reed bed has a curvature in a same direction as the curvature of the surface of the air channel;
   a barrel coupled to the mouthpiece and having an internal chamber that is fluidically coupled to the air channel of the mouthpiece;
   wherein the surface of the air channel varies in order to maintain a constant cross-sectional area along the length of the air channel; and
   a reed disposed adjacent the air channel and proximate the reed bed.

2. The animal call of claim 1, wherein a bottom surface of the mouthpiece is also curved.

3. The animal call of claim 1, wherein the mouthpiece has an end that is curved.

4. The animal call of claim 1, wherein the barrel has a cross section that resembles a "D".

5. The animal call of claim 1, and further comprising a lanyard groove.

6. An animal call comprising:
   a mouthpiece defining an air channel therein and having a reed bed proximate the air channel, the air channel having at least a bottom surface that is curved along a length of the air channel, the reed bed having a curvature in a same direction as the curvature of the bottom surface of the air channel, wherein the mouthpiece includes a bottom surface having a curvature along a length of the bottom surface of the mouthpiece that is in the same direction as the curvature of the reed bed;
   a reed disposed adjacent the air channel and proximate the bottom surface of the air channel;
   a barrel having a top surface spaced apart from a bottom surface to define an internal chamber that is fluidically coupled to the air channel of the mouthpiece, wherein the bottom surface of the barrel is planar and at least a portion of the top surface of the barrel has a curvature; and
   wherein the bottom surface of the air channel is curved such that a constant cross-sectional area magnitude is maintained along the length of the air channel.

7. The animal call of claim 6, wherein the length of the air channel extends from a first end of the mouthpiece proximate the barrel to a location proximate a second, opposite end of the mouthpiece.

8. The animal call of claim 7, wherein the second end of the mouthpiece is rounded.

9. The animal call of claim 6, wherein the barrel has a cross section that resembles a "D".

10. The animal call of claim 6, wherein the barrel has a first end proximate the mouthpiece and a second, opposite end comprising an opening, wherein the internal chamber of the barrel has a constant cross-sectional area from the first end of the barrel to the second end of the barrel.

* * * * *

UNITED STATES PATENT AND TRADEMARK OFFICE
CERTIFICATE OF CORRECTION

PATENT NO. : 7,727,044 B1  Page 1 of 1
APPLICATION NO. : 12/137651
DATED : June 1, 2010
INVENTOR(S) : Johnson It is certified that error appears in the above-identified patent and that said Letters Patent is hereby corrected as shown below:

Reference cited under Other Publication page 2, should read as follows:
Primos Hunting Calls – Lil" Dog™, https://shop.primos.com/pc-607-20-lil-dog.aspx.

Signed and Sealed this

Fourteenth Day of September, 2010

David J. Kappos
*Director of the United States Patent and Trademark Office*